United States Patent
Yang et al.

(10) Patent No.: US 10,904,083 B2
(45) Date of Patent: Jan. 26, 2021

(54) IOT SERVICE MODELING WITH LAYERED ABSTRACTION FOR REUSABILITY OF APPLICATIONS AND RESOURCES

(71) Applicant: Intel Corporation, Santa Clara, CA (US)

(72) Inventors: Shao-wen Yang, San Jose, CA (US); Yen-Kuang Chen, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/754,532

(22) PCT Filed: Sep. 25, 2015

(86) PCT No.: PCT/US2015/052361
§ 371 (c)(1),
(2) Date: Feb. 22, 2018

(87) PCT Pub. No.: WO2017/052624
PCT Pub. Date: Mar. 30, 2017

(65) Prior Publication Data
US 2018/0248753 A1    Aug. 30, 2018

(51) Int. Cl.
*H04L 12/24* (2006.01)
*H04W 4/70* (2018.01)
*H04W 84/18* (2009.01)

(52) U.S. Cl.
CPC ...... *H04L 41/0813* (2013.01); *H04L 41/0803* (2013.01); *H04L 41/12* (2013.01);
(Continued)

(58) Field of Classification Search
CPC .......... G06F 21/6218; G06F 8/20; G06F 8/61; G06F 7/58; G06F 7/588; G06F 8/51;
(Continued)

(56) References Cited

U.S. PATENT DOCUMENTS

| 8,954,526 B2 * | 2/2015 | Arthursson | ......... H04L 67/2842 709/217 |
| 10,402,195 B2 * | 9/2019 | Lee | ........................... G06F 8/76 |

(Continued)

FOREIGN PATENT DOCUMENTS

WO    2014124318 A1    8/2014

OTHER PUBLICATIONS

"Data Distribution Service for Real-time Systems Version 1.2", Object Management Group, Jan. 2007, 260 pages.
(Continued)

*Primary Examiner* — Ninos Donabed
(74) *Attorney, Agent, or Firm* — Jordan IP Law, LLC

(57) ABSTRACT

Systems, apparatuses and methods may identify a capability abstraction in a request to configure a first Internet of Things (IOT) application in a physical environment including a plurality of IOT devices and select a resource abstraction from a plurality of resource abstractions based on the capability abstraction. The selected resource abstraction may correspond to a first IOT device in the plurality of IOT devices. Additionally, the first IOT application may be bound with the first IOT device. In one example, first data originating from the first IOT device is received, a first runtime abstraction is selected from a plurality of runtime abstractions, wherein the first runtime abstraction corresponds to the first IOT application, and the first data is sent to the first IOT application via the first runtime abstraction.

12 Claims, 6 Drawing Sheets

(52) U.S. Cl.
CPC ........... *H04L 41/5058* (2013.01); *H04W 4/70* (2018.02); *H04W 84/18* (2013.01)

(58) Field of Classification Search
CPC ........ G06F 21/53; G06F 8/65; G06F 9/44505; H04L 63/123; H04L 63/20; H04L 67/12; H04W 4/70
See application file for complete search history.

(56) References Cited

U.S. PATENT DOCUMENTS

| | | | |
|---|---|---|---|
| 2005/0267889 A1* | 12/2005 | Snyder | G06F 16/283 |
| 2006/0136672 A1* | 6/2006 | Chaudhry | G06F 11/141 711/122 |
| 2007/0118654 A1* | 5/2007 | Jamkhedkar | H04L 41/0806 709/226 |
| 2007/0169001 A1* | 7/2007 | Raghunath | G06F 9/44547 717/130 |
| 2009/0119410 A1* | 5/2009 | Yang | H04L 65/4084 709/231 |
| 2009/0327345 A1* | 12/2009 | Torr | G06F 16/435 |
| 2011/0154302 A1* | 6/2011 | Balko | G06F 8/10 717/140 |
| 2012/0092727 A1 | 4/2012 | Furst et al. | |
| 2013/0246996 A1 | 9/2013 | Duggal et al. | |
| 2013/0297769 A1* | 11/2013 | Chang | G06F 9/45558 709/224 |
| 2014/0108558 A1 | 4/2014 | Borzycki et al. | |
| 2014/0115580 A1* | 4/2014 | Kellerman | H04N 21/4437 718/1 |
| 2015/0012669 A1* | 1/2015 | Hipp | G06F 15/16 709/250 |
| 2016/0006606 A1* | 1/2016 | Zhu | H04L 41/0803 370/338 |
| 2016/0048408 A1* | 2/2016 | Madhu | G06F 11/2097 718/1 |
| 2016/0094483 A1* | 3/2016 | Johnston | H04L 47/827 709/226 |
| 2016/0285966 A1* | 9/2016 | Brech | H04L 41/0893 |
| 2016/0366141 A1* | 12/2016 | Smith | H04L 63/062 |
| 2017/0339251 A1* | 11/2017 | Jagannath | H04L 67/10 |
| 2018/0248753 A1* | 8/2018 | Yang | H04L 41/5058 |
| 2018/0365138 A1* | 12/2018 | Bain | G06F 9/45558 |

OTHER PUBLICATIONS

"Docker Orchestration Product Brief", Docker, 2 pages.
"MQTT Version 3.1.1 OASIS Standard", OASIS, Oct. 29, 2014, 81 pages.
"ROS Graph Concepts", Open Source Robotics Foundation, retrieved Sep. 7, 2015, wiki.ros.org/Messages, 2 pages.
International Search Report and Written Opinion for International Patent Application No. PCT/US2015/052361, dated Jul. 22, 2016, 11 pages.
International Preliminary Report on Patentability for International Patent Application No. PCT/US2015/052361, dated Apr. 5, 2018, 8 pages.

* cited by examiner

IOT SERVICE MODELING WITH LAYERED ABSTRACTION FOR REUSABILITY OF APPLICATIONS AND RESOURCES

CROSS REFERENCE TO RELATED APPLICATIONS

This application is a U.S. National Phase Patent Application claiming benefit to International Patent Application No. PCT/US2015/052361 filed on Sep. 25, 2015.

TECHNICAL FIELD

Embodiments generally relate to the Internet of Things (IOT). More particularly, embodiments relate to IOT service modeling with layered abstraction for reusability of applications and resources.

BACKGROUND

Internet of Things (IOT) solutions may enable household devices such as thermostats, washers/dryers, and so forth, to interactively report operational data to homeowners, utility companies and other analytical services. The code of an IOT application may typically be embedded with unique identifiers (IDs, e.g., media access control/MAC addresses) of the devices used by the application. Accordingly, when the IOT application is deployed in a physical environment, the application may be permanently bound to particular IOT devices in the environment. If the IOT devices malfunction, reconfiguration of the application may be time consuming and costly due to the inflexible nature of the deployment. Additionally, if multiple IOT applications are deployed in the same environment, each application may be bound to a dedicated set of devices, which may be inefficient and further increase costs.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
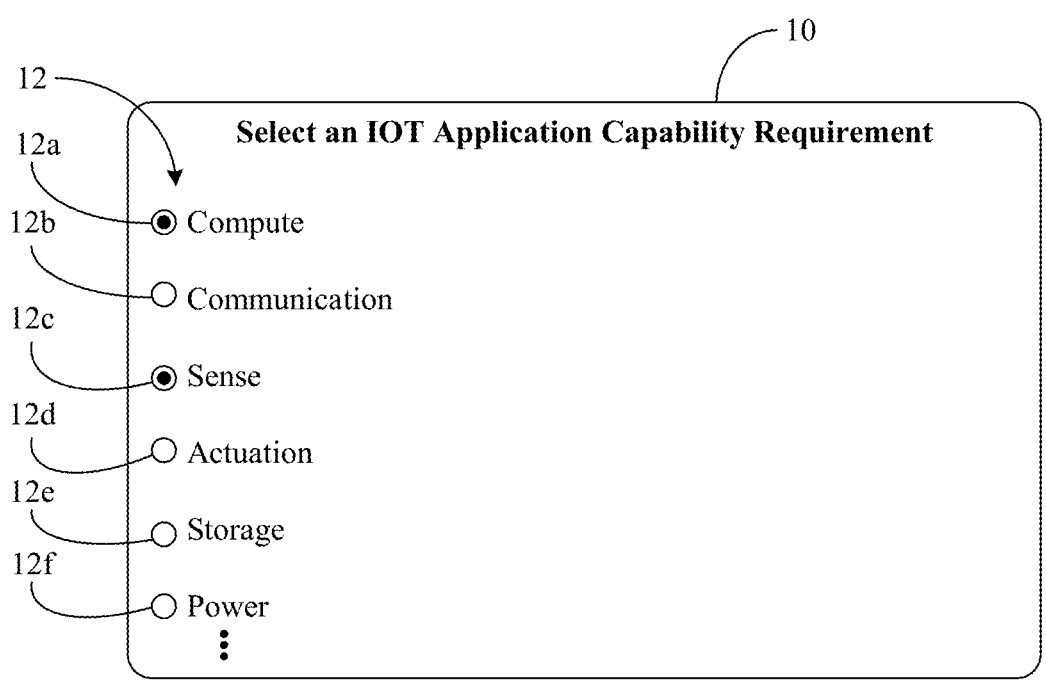
FIG. 1 is an illustration of an example of a prompt according to an embodiment.

Turning now to FIG. 1, a user prompt 10 is shown in which a plurality of capability abstractions 12 (12a-12f) are presented on a display. The capability abstractions 12 may generally be used to configure an application such as, for example, an Internet of Things (IOT) application for operation in a physical environment including a plurality of devices such as, for example, IOT devices (e.g., light sensors, Internet Protocol/IP cameras, infrared sensors, central processing units/CPUs, solid state disks/SSDs, power switches, thermostats, appliances, and other resources). The IOT application may perform a wide variety of functions such as, for example, home/office automation, retail facility presence monitoring (e.g., in automated entrance/exit systems), wide area (e.g., city, town) surveillance, and so forth.

The capability abstractions 12 may reference basic functional abilities without specifying the types of IOT devices that provide the referenced abilities (e.g. resulting in a layer of capability abstraction) or specifying the particular IOT devices that provide the referenced abilities (e.g., resulting in a layer of resource abstraction). Another layer of runtime abstraction may also be achieved by enabling multiple virtual instances to be created for each IOT device in the physical environment. In the illustrated example, the capability abstractions 12 include categories such as, for example, a compute option 12a, a communication option 12b, a sense option 12c, an actuation option 12d, a storage option 12e and a power option 12f, although different options/capability abstractions may be used depending on the circumstances. As will be discussed in greater detail, resource abstraction and capability abstraction may enhance reusability (e.g., portability) as well as resource efficiency. Moreover, runtime abstraction may further enhance resource efficiency.

Figure 2:
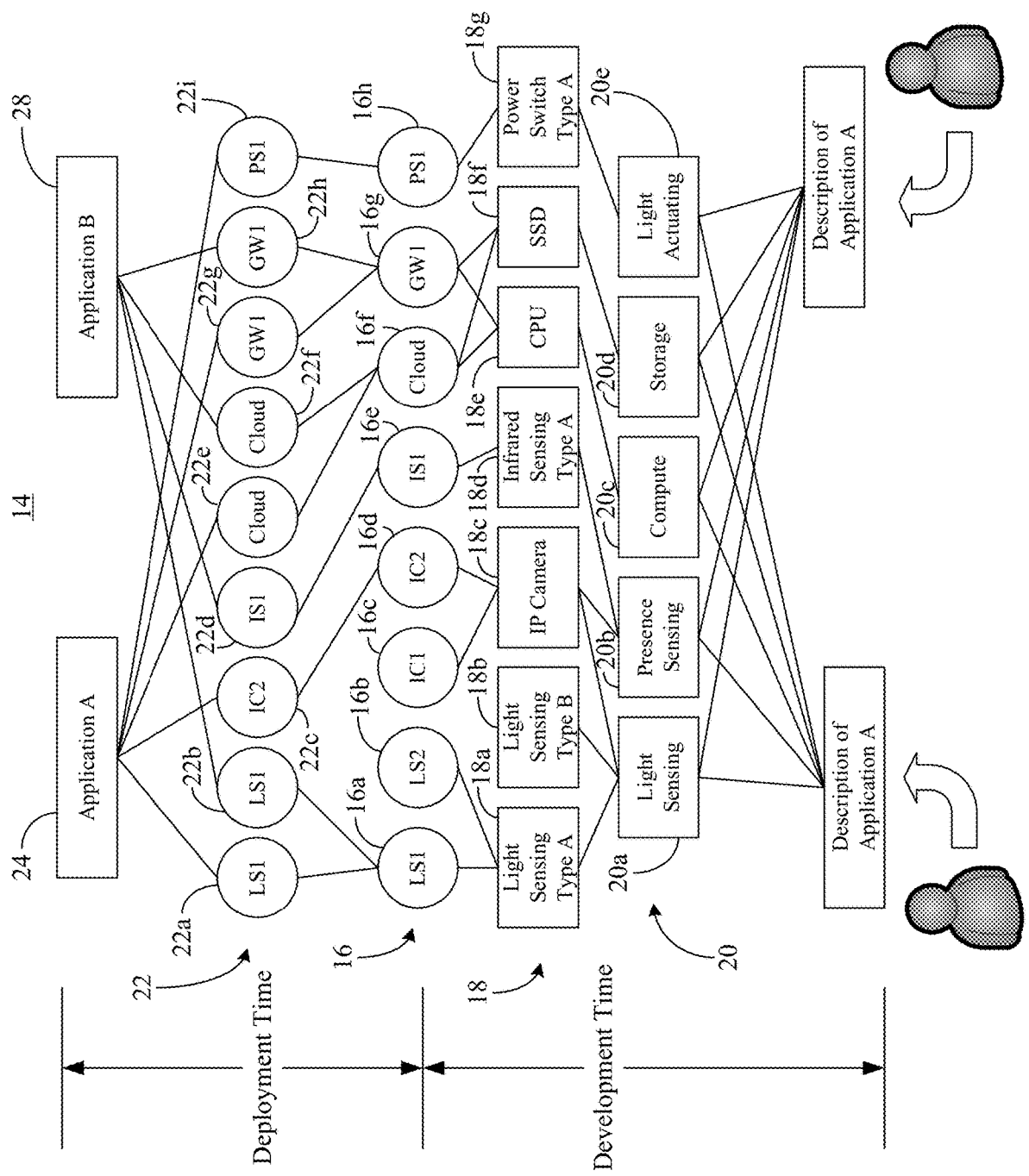
FIG. 2 is an illustration of an example of an IOT service model having layered abstraction according to an embodiment.

FIG. 2 shows an IOT service model 14 in which a plurality of IOT devices 16 (16a-16h, e.g., at a physical layer) have a resource abstraction layer 18 (18a-18g), a capability abstraction layer 20 (20a-20e) and a runtime abstraction layer 22 (22a-22i). The illustrated capability abstraction layer 20 includes categories such as, for example, a light sensing option 20a, a presence sensing option 20b, a compute option 20c, a storage option 20d, a light actuation option 20e, etc., wherein the capability abstraction layer 20 may reference basic functional abilities without specifying the types of IOT devices 16 that provide the referenced abilities (e.g. resulting in a layer of capability abstraction) or specifying the particular IOT devices 16 that provide the referenced abilities (e.g., resulting in a layer of resource abstraction).

The plurality of IOT devices 16 may include, for example, light sensors (generally "LS") such as a first light sensor 16a (LS1) and a second light sensor 16b (LS2), IP cameras (generally "IC") such as a first IP camera 16c (IC1) and a second IP camera 16d (IC2), infrared sensors (generally "IS") such as a first infrared sensor 16e (IS1), cloud computing nodes (generally "Cloud") such as a first cloud node 16f, gateways (generally "GW") such as a first gateway 16g (GW1), power switches (generally "PS") such as a first power switch 16h (PSI), and so forth. Additionally, the resource abstraction layer 18 may include, for example, a "Type A" light sensing resource abstraction 18a (e.g., ZIGBEE HA/home automation light sensing), a "Type B" light sensing resource abstraction 18b (e.g., BLUETOOTH smart light sensing), an IP camera resource abstraction 18c, a "Type A" infrared sensing resource abstraction 18d (e.g., ZIGBEE HA infrared sensing), a CPU resource abstraction 18e, an SSD resource abstraction 18f, a "Type A" power switching resource abstraction 18g (e.g., ZIGBEE HA power switching), and so forth.

In general, a request to configure an IOT application such as, for example, a first application 24 ("Application A") for operation in a physical environment including the plurality of IOT devices 16 may be entered by a user at development time in response to a prompt such as, for example, the prompt 10 (FIG. 1). The request may extend through the capability abstraction layer 20 and the resource abstraction layer 18 to the physical layer containing the IOT devices 16. More particularly, the request might include, for example, the light sensing capability abstraction 20*a*, wherein the Type A light sensing resource abstraction 18*a* may be selected from a plurality of resource abstractions based on the light sensing capability abstraction 20*a*. In the illustrated example, the Type A light sensing resource abstraction 18*a* may be provided by either the first light sensor 16*a* or the second light sensor 16*b* in the physical environment. Accordingly, the first application 24 may be bound (e.g., associated, linked) with the first light sensor 16*a* for the purposes of light sensing.

Of particular note is that if the first light sensor 16*a* malfunctions, the first application 24 may be automatically bound with any other IOT device 16 having the light sensing capability without requiring the first application 24 to be re-programmed with new embedded IDs, MAC addresses, etc., that are unique to the new IOT device 16. Thus, the second light sensor 16*b* might be readily substituted for the first light sensor 16*a*, in the illustrated example. Indeed, even another type of light sensor that corresponds to the Type B light sensing resource abstraction 18*b* and has different connectivity (e.g., BLE/BLUETOOTH low energy) may be substituted for the first light sensor 16*a*. Moreover, different types of IOT devices having overlapping capabilities may replace one another in a manner that is transparent to the user. For example, if the first cloud node 16*f* is used by the first application 24 for compute capability, a failure in the first cloud node 16*f* may cause the first gateway 16*g* to be automatically bound with the compute option 20*c* of the capability abstraction layer 20.

Additionally, a first runtime abstraction 22*a* (e.g., virtual instance) may be selected and/or invoked from a plurality of runtime abstractions at the runtime abstraction layer 22, wherein the first runtime abstraction 22*a* may be dedicated to the first application 24. Accordingly, data generated by the first light sensor 16*a* may be sent at deployment time to the first application 24 via the first runtime abstraction 22*a*. By contrast, a second runtime abstraction 22*b* may be selected and/or invoked from the plurality of runtime abstractions, wherein the second runtime abstraction 22*b* may be dedicated to a second application 28 ("Application B"). Thus, data generated by the first light sensor 16*a* may also be sent to the second application 28 via the second runtime abstraction 22*b*. The illustrated runtime abstraction layer 22 may therefore improve resource efficiency by enabling the IOT devices 16 to be reused/shared across multiple applications. Runtime abstraction may also obviate multi-stakeholder concerns over resource isolation.

In one example, the runtime abstraction layer 22 is implemented via multi-threading. For example, a JAVA servlet may package virtual instances of the IOT devices 16 into different threads, which a) interact with corresponding preceding and successive resources for an application, and b) interact with the underlying physical resource through resource abstraction. Virtual instance packaging may also be achieved through containers such as, for example, DOCKER containers.

Figures 3, 4:
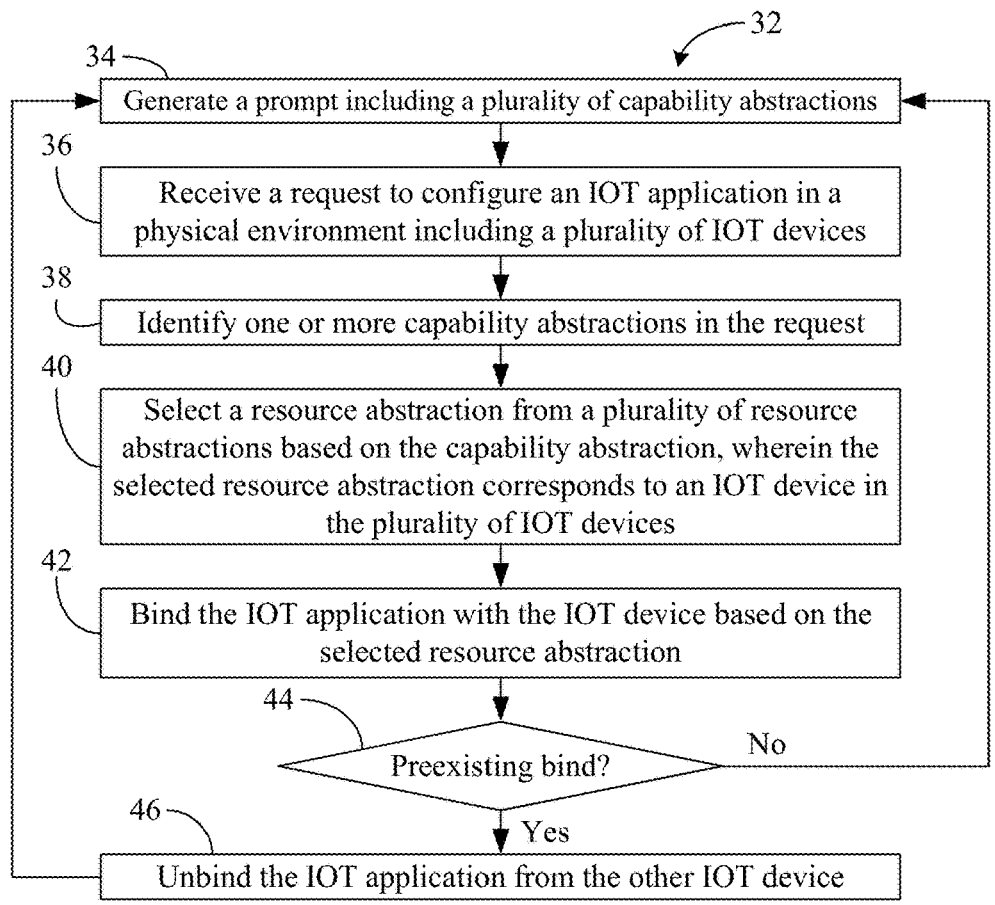
FIG. 3 is a flowchart of an example of a method of operating a layered abstraction controller to enhance application reusability according to an embodiment.
FIG. 4 is a flowchart of an example of a method of operating a layered abstraction controller to enhance resource reusability according to an embodiment.

FIG. 3 shows a method 32 of operating a layered abstraction controller to enhance application reusability. The method 32 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 32 may be written in any combination of one or more programming languages, including an object oriented programming language such as JAVA, SMALLTALK, C++ or the like and conventional procedural programming languages, such as the "C" programming language or similar programming languages.

Illustrated processing block 34 provides for generating a prompt including a plurality of capability abstractions (e.g., options). The prompt may be similar to the prompt 10 (FIG. 1) and/or may implement a capability abstraction layer such as the capability abstraction layer 20 (FIG. 2), already discussed. Thus, the plurality of capability abstractions may include, for example, a compute option, a communication option, a sense option, an actuation option, a storage option, a power option, and so forth. Block 36 may receive a request to configure an IOT application in a physical environment including a plurality of IOT devices, wherein the request is associated with the prompt.

Additionally, one or more capability abstractions may be identified in the request at block 38. Illustrated block 40 selects a resource abstraction from a plurality of resource abstractions based on the capability abstraction, wherein the selected resource abstraction corresponds to one or more IOT devices in the plurality of IOT devices. Block 42 may bind the IOT application with at least one of the one or more IOT devices based on the selected resource abstraction. If it is determined at block 44 that the IOT application is already bound with another IOT device (e.g., that has malfunctioned), illustrated block 46 unbinds the IOT application from the other IOT device and the method 32 may repeat. Otherwise, the method 32 may repeat without conducting block 46.

FIG. 4 shows a method 48 of operating a layered abstraction controller to enhance resource reusability. The method 48 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 50 provides for receiving first data originating from an IOT device such as, for example, one of the plurality of IOT devices 16 (FIG. 2), already discussed. A first runtime abstraction may be selected and/or invoked at block 52 from a plurality of runtime abstractions, wherein the first runtime abstraction corresponds to a first IOT application. Additionally, illustrated block 54 sends the first data to the first IOT application via the first runtime abstraction. Block 56 may provide for receiving second data originating from the first IOT device, wherein a second runtime abstraction may be selected and/or invoked from a plurality of runtime abstractions at block 58. In the illustrated example, the second runtime abstraction corresponds to a second IOT application. The second data may be sent to the second IOT application via the second runtime abstraction at block 60.

Figure 5:
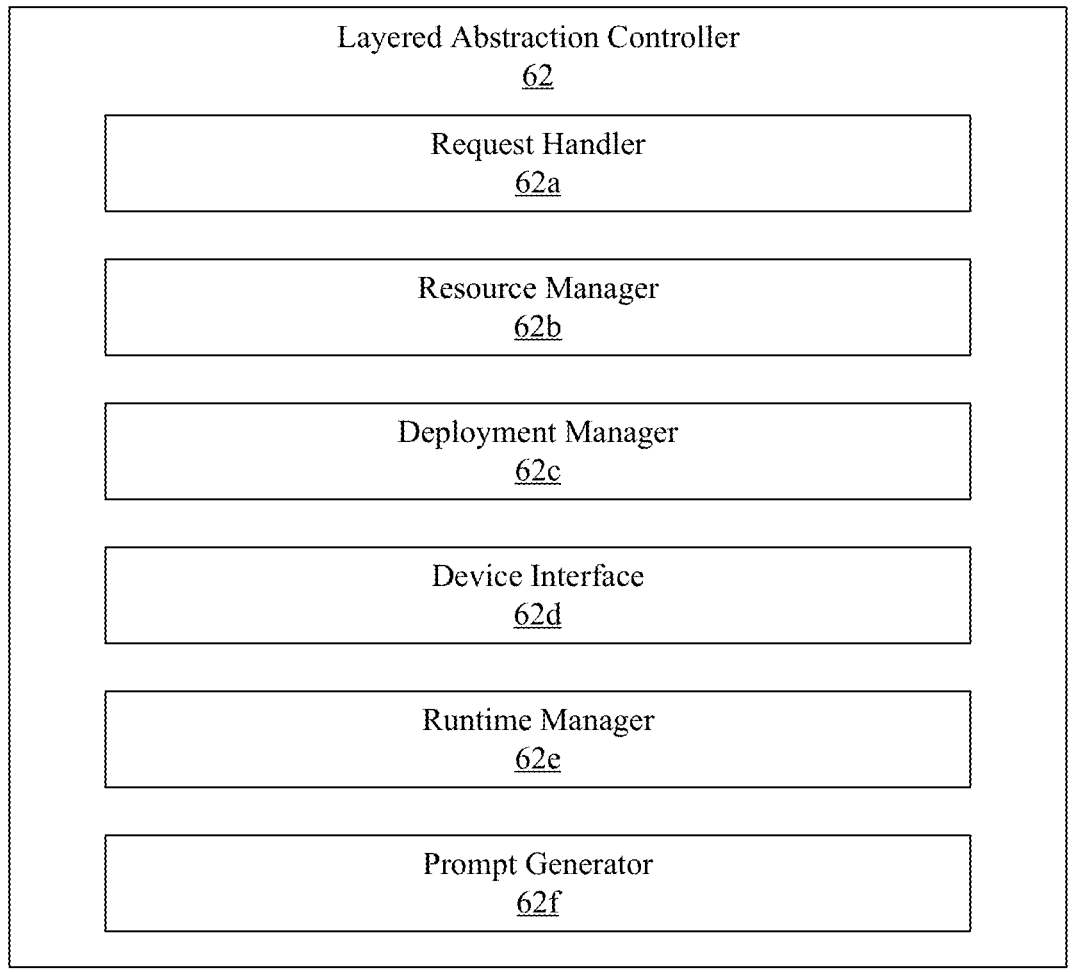
FIG. 5 is a block diagram of an example of a layered abstraction controller according to an embodiment.

Turning now to FIG. 5 a layered abstraction controller 62 is shown. The layered abstraction controller 62 (62a-62f), which may include logic instructions, configurable logic, fixed-functionality logic hardware, etc., or any combination thereof, may implement one or more aspects of the method 32 (FIG. 3) and/or the method 48 (FIG. 4). In the illustrated example, a request handler 62a identifies a capability abstraction in a request to bind a first IOT application in a physical environment including a plurality of IOT devices. The controller 62 may also include a resource manager 62b that selects a resource abstraction from a plurality of resource abstractions based on the capability abstraction, wherein the selected resource abstraction corresponds to a first IOT device in the plurality of IOT devices. A deployment manager 62c may bind the first IOT application with the first IOT device. Additionally, when the first IOT application is already bound with a second IOT device that has malfunctioned, the deployment manager 62c may unbind the first IOT application from the second IOT device.

In one example, the controller 62 further includes a device interface 62d to receive first data originating from the first IOT device and a runtime manager 62e to select a first runtime abstraction from a plurality of runtime abstractions, wherein the first runtime abstraction corresponds to the first IOT application. In such a case, the runtime manager 62e may also send the first data to the first IOT application via the first runtime abstraction. If, on the other hand, the device interface 62d receives second data originating from the first IOT device, the runtime manager 62e may select a second runtime abstraction that corresponds to a second IOT application. Thus, the runtime manager 62e may send the second data to the second IOT application via the second runtime abstraction.

The controller 62 may also include a prompt generator 62f to generate a prompt including a plurality of capability abstractions, wherein the request to bind the application is associated with the prompt. The plurality of capability abstractions may include, for example, a compute option, a communication option, a sense option, an actuation option, a storage option, a power option, and so forth.

Figure 6:
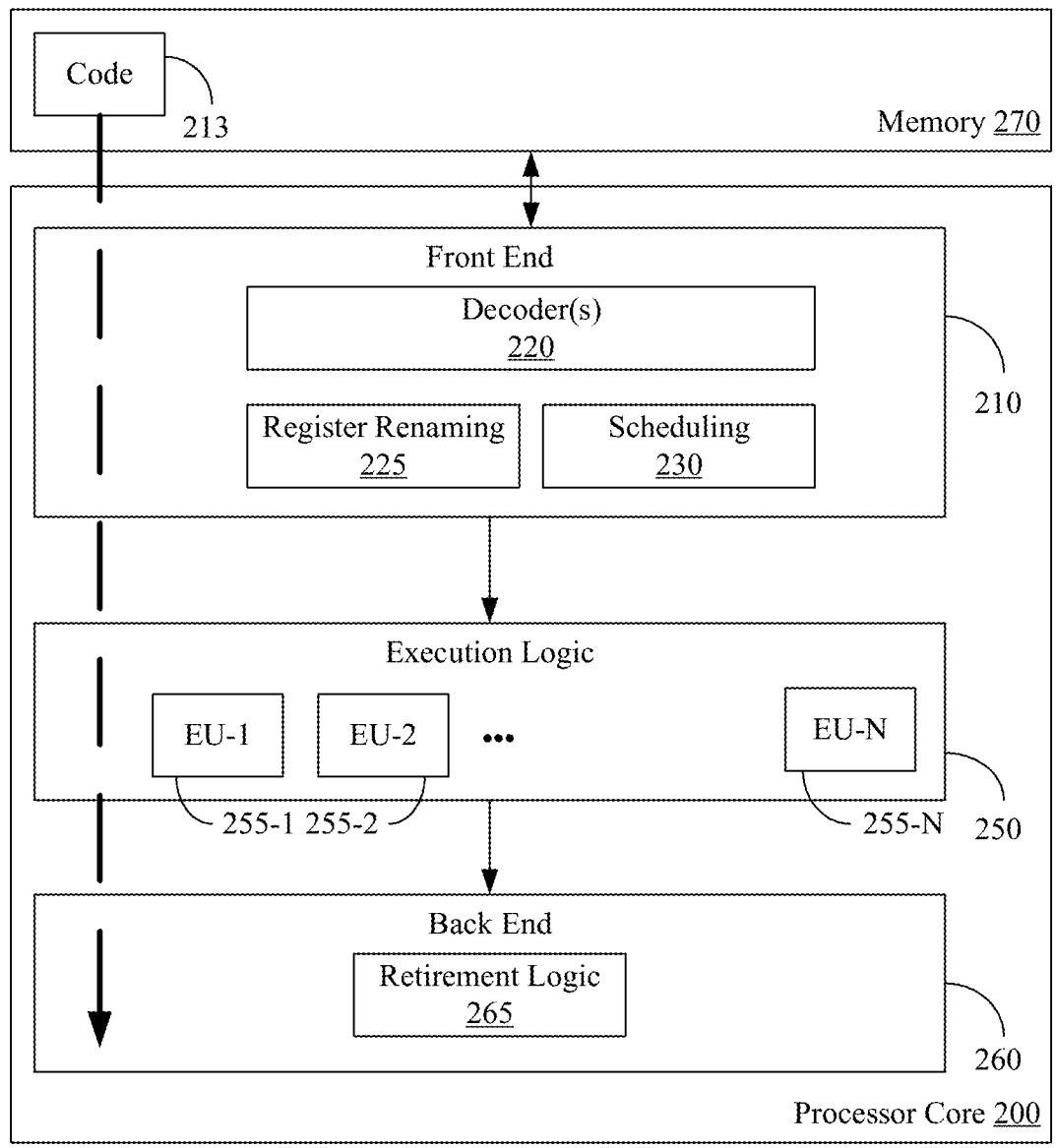
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 32 (FIG. 3) and/or the method 48 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
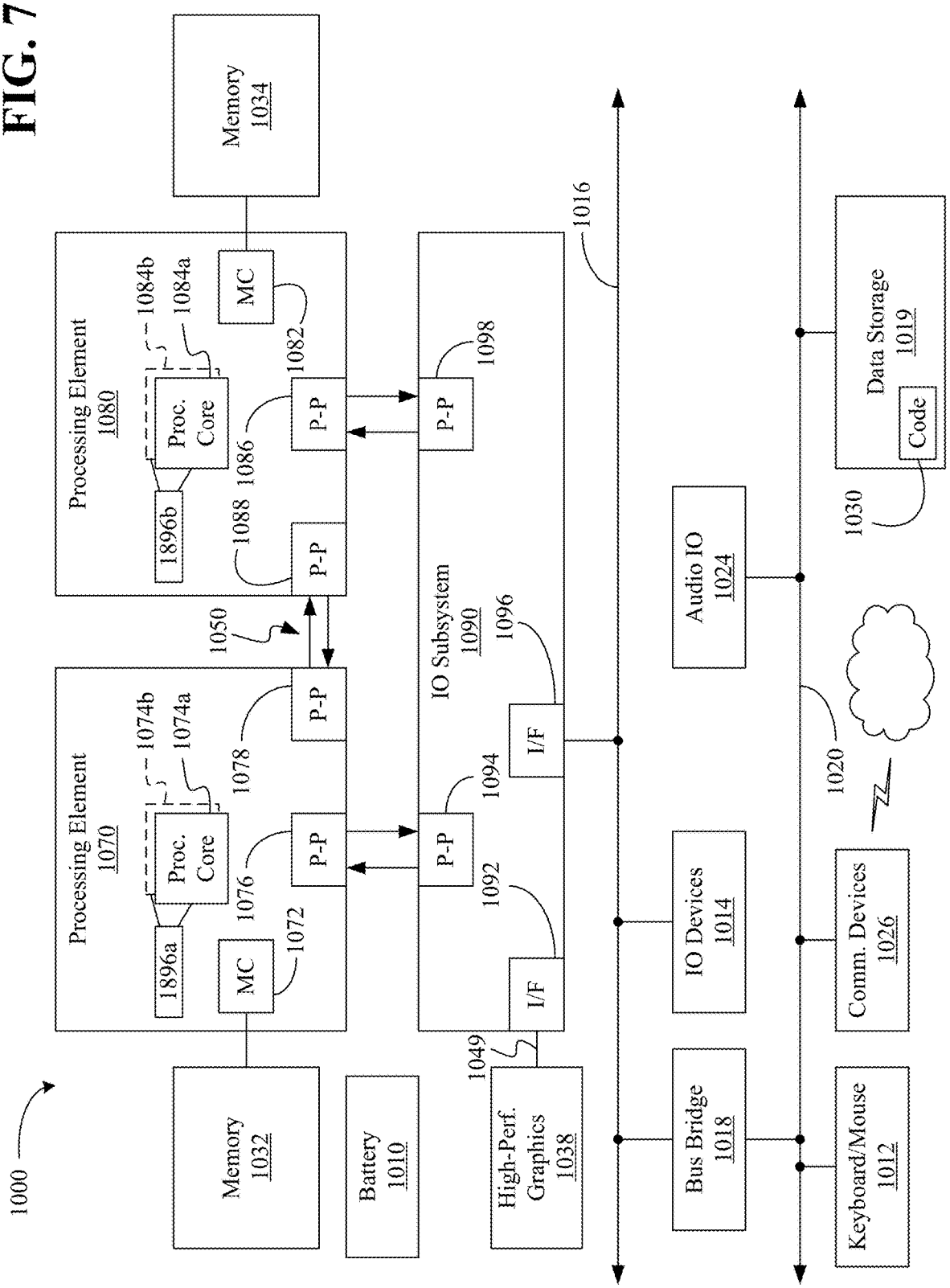
FIG. 7 is a block diagram of an example of a computing system according to an embodiment.

Referring now to FIG. 7, shown is a block diagram of a computing system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 32 (FIG. 3) and/or the method 48 (FIG. 4), already discussed, and may be similar to the code 213 (FIG. 6), already discussed. The system 1000 may also include a layered abstraction controller such as, for example, the layered abstraction controller 62 (FIG. 5). In one example, requests to bind IOT applications in physical environments are received via input device such as the I/O devices 1014 and the bindings are documented in memory module such as the memory 1032, 1034. Further, an audio I/O 1024 may be coupled to second bus 1020 and a battery 1010 may supply power to the computing system 1000.

Note that other embodiments are contemplated. For example, instead of the point-to-point architecture of FIG. 7, a system may implement a multi-drop bus or another such communication topology. Also, the elements of FIG. 7 may alternatively be partitioned using more or fewer integrated chips than shown in FIG. 7.

ADDITIONAL NOTES AND EXAMPLES

Example 1 may include a computing system to enhance reusability of components, comprising a memory module, an input device to receive a request to bind a first application in a physical environment including a plurality of devices, and a layered abstraction controller including a request handler to identify a capability abstraction in the request, a resource manager to select a resource abstraction from a plurality of resource abstractions based on the capability abstraction, wherein the selected resource abstraction corresponds to a first device in the plurality of devices, and a deployment manager to bind the first application with the first device, wherein the memory module is to document the bind between the first application and the first device.

Example 2 may include the system of Example 1, wherein the layered abstraction controller further includes a device interface to receive first data originating from the first device, and a runtime manager to select a first runtime abstraction from a plurality of runtime abstractions, wherein the first runtime abstraction corresponds to the first application, and wherein the runtime manager is to send the first data to the first application via the first runtime abstraction.

Example 3 may include the system of Example 2, wherein the device interface is to receive second data originating from the first device, the runtime manager is to select a second runtime abstraction from the plurality of runtime abstractions, the second runtime abstraction corresponds to a second application, and the runtime manager is to send the second data to the second application via the second runtime abstraction.

Example 4 may include the system of Example 1, wherein the layered abstraction controller further includes a prompt generator to generate a prompt including a plurality of capability abstractions, and wherein the request is to be associated with the prompt.

Example 5 may include the system of Example 4, wherein the plurality of capability abstractions is to include one or more categories.

Example 6 may include the system of any one of Examples 1 to 5, wherein when the first application is bound with a second device that has malfunctioned, the deployment manager is to unbind the first application from the second device.

Example 7 may include a layered abstraction controller apparatus comprising a request handler to identify a capability abstraction in a request to configure a first application in a physical environment including a plurality of devices, a resource manager to select a resource abstraction from a plurality of resource abstractions based on the capability abstraction, wherein the selected resource abstraction corresponds to a first device in the plurality of devices, and a deployment manager to bind the first application with the first device.

Example 8 may include the apparatus of Example 7, further including a device interface to receive first data originating from the first device, and a runtime manager to select a first runtime abstraction from a plurality of runtime abstractions, wherein the first runtime abstraction corresponds to the first application, and wherein the runtime manager is to send the first data to the first application via the first runtime abstraction.

Example 9 may include the apparatus of Example 8, wherein the device interface is to receive second data originating from the first device, the runtime manager is to select a second runtime abstraction from the plurality of runtime abstractions, the second runtime abstraction corresponds to a second application, and the runtime manager is to send the second data to the second application via the second runtime abstraction.

Example 10 may include the apparatus of Example 7, further including a prompt generator to generate a prompt including a plurality of capability abstractions, wherein the request is to be associated with the prompt.

Example 11 may include the apparatus of Example 10, wherein the plurality of capability abstractions is to include one or more categories.

Example 12 may include the apparatus of any one of Examples 7 to 11, wherein when the first application is bound with a second device that has malfunctioned, the deployment manager is to unbind the first application from the second device.

Example 13 may include a method of operating a layered abstraction controller, comprising identifying a capability abstraction in a request to configure a first application in a physical environment including a plurality of devices, selecting a resource abstraction from a plurality of resource abstractions based on the capability abstraction, wherein the selected resource abstraction corresponds to a first device in the plurality of devices, and binding the first application with the first device.

Example 14 may include the method of Example 13, further including receiving first data originating from the first device, selecting a first runtime abstraction from a plurality of runtime abstractions, wherein the first runtime abstraction corresponds to the first application, and sending the first data to the first application via the first runtime abstraction.

Example 15 may include the method of Example 14, further including receiving second data originating from the first device, selecting a second runtime abstraction from the plurality of runtime abstractions, wherein the second runtime abstraction corresponds to a second application, and sending the second data to the second application via the second runtime abstraction.

Example 16 may include the method of Example 13, further including generating a prompt including a plurality of capability abstractions, wherein the request is associated with the prompt.

Example 17 may include the method of Example 16, wherein the plurality of capability abstractions includes one or more categories.

Example 18 may include the method of any one of Examples 13 to 17, wherein the first application is bound with a second device that has malfunctioned and the method further includes unbinding the first application from the second device.

Example 19 may include at least one non-transitory computer readable storage medium comprising a set of instructions, which when executed by a computing device, cause the computing device to identify a capability abstraction in a request to configure a first application in a physical environment including a plurality of devices, select a resource abstraction from a plurality of resource abstractions based on the capability abstraction, wherein the selected resource abstraction corresponds to a first device in the plurality of devices, and bind the first application with the first device.

Example 20 may include the at least one computer readable storage medium of Example 19, wherein the instructions, when executed, cause a computing device to receive first data originating from the first device, select a first runtime abstraction from a plurality of runtime abstractions, wherein the first runtime abstraction corresponds to the first application, and send the first data to the first application via the first runtime abstraction.

Example 21 may include the at least one computer readable storage medium of Example 20, wherein the instructions, when executed, cause a computing device to receive second data originating from the first device, select a second runtime abstraction from the plurality of runtime abstractions, wherein the second runtime abstraction corresponds to a second application, and send the second data to the second application via the second runtime abstraction.

Example 22 may include the at least one computer readable storage medium of Example 19, wherein the instructions, when executed, cause a computing device to generate a prompt including a plurality of capability abstractions, and wherein the request is to be associated with the prompt.

Example 23 may include the at least one computer readable storage medium of Example 22, wherein the plurality of capability abstractions is to include one or more categories.

Example 24 may include the at least one computer readable storage medium of any one of Examples 19 to 23, wherein when the first application is bound with a second device that has malfunctioned, the instructions, when executed, cause a computing device to unbind the first application from the second device.

Example 25 may include a layered abstraction controller apparatus comprising means for identifying a capability abstraction in a request to configure a first application in a physical environment including a plurality of devices, means for selecting a resource abstraction from a plurality of resource abstractions based on the capability abstraction, wherein the selected resource abstraction corresponds to a first device in the plurality of devices, and means for binding the first application with the first device.

Example 26 may include the apparatus of Example 25, further including means for receiving first data originating from the first device, means for selecting a first runtime abstraction from a plurality of runtime abstractions, wherein the first runtime abstraction corresponds to the first application, and means for sending the first data to the first application via the first runtime abstraction.

Example 27 may include the apparatus of Example 26, further including means for receiving second data originating from the first device, means for selecting a second runtime abstraction from the plurality of runtime abstractions, wherein the second runtime abstraction corresponds to a second application, and means for sending the second data to the second application via the second runtime abstraction.

Example 28 may include the apparatus of Example 25, further including means for generating a prompt including a plurality of capability abstractions, wherein the request is associated with the prompt.

Example 29 may include the apparatus of Example 28, wherein the plurality of capability abstractions are to include one or more categories.

Example 30 may include the apparatus of any one of Examples 25 to 29, wherein the first application is to be bound with a second device that has malfunctioned and the apparatus further includes means for unbinding the first application from the second device.

Thus, techniques described herein may enable reusability of IOT resources, which may in turn lead to easier deployment of IOT applications. Indeed, new IOT applications may be deployed without installing any new IOT devices whatsoever.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a memory module;
an input device to receive a request to bind a first application in a physical environment including a plurality of devices; and
a layered abstraction controller including,
a request handler to identify a capability abstraction in the request;
a resource manager to select a resource abstraction from a plurality of resource abstractions based on the capability abstraction, wherein the selected resource abstraction corresponds to a first device in the plurality of devices; and
a deployment manager to bind the first application with the first device, wherein the memory module is to document the bind between the first application and the first device,
wherein when the first application is bound with a second device that has malfunctioned, the deployment manager is to unbind the first application from the second device,
wherein the layered abstraction controller further includes:
a device interface to receive first data originating from the first device; and
a runtime manager to select a first runtime abstraction from a plurality of runtime abstractions, wherein the first runtime abstraction corresponds to the first application, and wherein the runtime manager is to send the first data to the first application via the first runtime abstraction, and
wherein the device interface is to receive second data originating from the first device, the runtime manager is to select a second runtime abstraction from the plurality of runtime abstractions, the second runtime abstraction corresponds to a second application, and the runtime manager is to send the second data to the second application via the second runtime abstraction.

2. The system of claim 1, wherein the layered abstraction controller further includes a prompt generator to generate a prompt including a plurality of capability abstractions, and wherein the request is to be associated with the prompt.

3. The system of claim 2, wherein the plurality of capability abstractions is to include one or more categories.

4. An apparatus comprising:
a request handler to identify a capability abstraction in a request to configure a first application in a physical environment including a plurality of devices;
a resource manager to select a resource abstraction from a plurality of resource abstractions based on the capability abstraction, wherein the selected resource abstraction corresponds to a first device in the plurality of devices;

a deployment manager to bind the first application with the first device;

a device interface to receive first data originating from the first device; and a runtime manager to select a first runtime abstraction from a plurality of runtime abstractions, wherein the first runtime abstraction corresponds to the first application, and wherein the runtime manager is to send the first data to the first application via the first runtime abstraction, wherein when the first application is bound with a second device that has malfunctioned, the deployment manager is to unbind the first application from the second device, wherein the device interface is to receive second data originating from the first device, the runtime manager is to select a second runtime abstraction from the plurality of runtime abstractions, the second runtime abstraction corresponds to a second application, and the runtime manager is to send the second data to the second application via the second runtime abstraction.

5. The apparatus of claim 4, further including a prompt generator to generate a prompt including a plurality of capability abstractions, wherein the request is to be associated with the prompt.

6. The apparatus of claim 5, wherein the plurality of capability abstractions is to include one or more categories.

7. A method comprising:

identifying a capability abstraction in a request to configure a first application in a physical environment including a plurality of devices;

selecting a resource abstraction from a plurality of resource abstractions based on the capability abstraction, wherein the selected resource abstraction corresponds to a first device in the plurality of devices;

binding the first application with the first device;

receiving first data originating from the first device;

selecting a first runtime abstraction from a plurality of runtime abstractions, wherein the first runtime abstraction corresponds to the first application;

sending the first data to the first application via the first runtime abstraction;

receiving second data originating from the first device;

selecting a second runtime abstraction from the plurality of runtime abstractions, wherein the second runtime abstraction corresponds to a second application; and sending the second data to the second application via the second runtime abstraction, wherein the first application is bound with a second device that has malfunctioned and the method further includes unbinding the first application from the second device.

8. The method of claim 7, further including generating a prompt including a plurality of capability abstractions, wherein the request is associated with the prompt.

9. The method of claim 8, wherein the plurality of capability abstractions includes one or more categories.

10. At least one non-transitory computer readable storage medium comprising a set of instructions, which when executed by a computing device, cause the computing device to:

identify a capability abstraction in a request to configure a first application in a physical environment including a plurality of devices;

select a resource abstraction from a plurality of resource abstractions based on the capability abstraction, wherein the selected resource abstraction corresponds to a first device in the plurality of devices;

bind the first application with the first device;

when the first application is bound with a second device that has malfunctioned, unbind the first application from the second device;

receive first data originating from the first device;

select a first runtime abstraction from a plurality of runtime abstractions, wherein the first runtime abstraction corresponds to the first application;

send the first data to the first application via the first runtime abstraction;

receive second data originating from the first device;

select a second runtime abstraction from the plurality of runtime abstractions, wherein the second runtime abstraction corresponds to a second application; and send the second data to the second application via the second runtime abstraction.

11. The at least one computer readable storage medium of claim 10, wherein the instructions, when executed, cause a computing device to generate a prompt including a plurality of capability abstractions, and wherein the request is to be associated with the prompt.

12. The at least one computer readable storage medium of claim 11, wherein the plurality of capability abstractions is to include one or more categories.

* * * * *